(12) United States Patent
Kamada

(10) Patent No.: US 11,512,001 B2
(45) Date of Patent: Nov. 29, 2022

(54) METHOD FOR PRODUCING POLYSILICON

(71) Applicant: TOKUYAMA CORPORATION, Yamaguchi (JP)

(72) Inventor: Makoto Kamada, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 183 days.

(21) Appl. No.: 16/622,708

(22) PCT Filed: Jun. 4, 2018

(86) PCT No.: PCT/JP2018/021363
§ 371 (c)(1),
(2) Date: Dec. 13, 2019

(87) PCT Pub. No.: WO2018/230380
PCT Pub. Date: Dec. 20, 2018

(65) Prior Publication Data
US 2020/0102223 A1    Apr. 2, 2020

(30) Foreign Application Priority Data
Jun. 16, 2017    (JP) .............................. JP2017-119125

(51) Int. Cl.
*C01B 33/035*    (2006.01)
(52) U.S. Cl.
CPC ................................. *C01B 33/035* (2013.01)
(58) Field of Classification Search
CPC ............................ C01B 33/035; C04B 7/4415
See application file for complete search history.

(56) References Cited

U.S. PATENT DOCUMENTS

| | | | |
|---|---|---|---|
| 2008/0038178 A1* | 2/2008 | Altmann | C01B 33/03 423/348 |
| 2011/0268892 A1 | 11/2011 | Oda et al. | |
| 2015/0175430 A1* | 6/2015 | Sakida | F22B 1/18 423/350 |

(Continued)

FOREIGN PATENT DOCUMENTS

| | | |
|---|---|---|
| CN | 102838118 A | 12/2012 |
| EP | 2394955 | 12/2016 |

(Continued)

OTHER PUBLICATIONS

EP Search Report for EP Patent Appl. No. 18817750.5, dated Mar. 11, 2021, 7 pages.

(Continued)

*Primary Examiner* — Anthony J Zimmer
*Assistant Examiner* — Logan Edward Laclair
(74) *Attorney, Agent, or Firm* — Casimir Jones, SC; Robert A. Goetz

(57) ABSTRACT

A method for efficiently producing polysilicon is realized. The present invention is an invention of a method for producing polysilicon by the Siemens process, a chemical reactor being connected to a waste gas processing facility via a blocking valve provided to a waste gas pipe, the blocking valve being provided in a vicinity of a waste gas outlet of the chemical reactor, the method including the step of cooling a waste gas between the waste gas outlet of the chemical reactor and the blocking valve, with use of a cooler of an indirect cooling type.

3 Claims, 2 Drawing Sheets

(56) References Cited

U.S. PATENT DOCUMENTS

2017/0159174 A1 6/2017 Weckesser
2018/0229203 A1 8/2018 Park et al.

FOREIGN PATENT DOCUMENTS

| JP | 2010-150131 | 7/2010 | | |
|----|----|----|----|----|
| JP | 2016-521238 | 7/2016 | | |
| WO | 2010/090203 | 8/2010 | | |
| WO | WO-2010090203 A1 * | 8/2010 | ........... | C01B 33/035 |
| WO | 2014/010457 | 1/2014 | | |
| WO | 2017/043892 | 3/2017 | | |

OTHER PUBLICATIONS

English Translation of International Preliminary Report on Patentability (chapter II) for PCT/JP2018/021363, dated Dec. 19, 2019.
Office Action for CN Patent Application No. 2018800401268, dated Jul. 11, 2022, 7 pages.

* cited by examiner

METHOD FOR PRODUCING POLYSILICON

TECHNICAL FIELD

The present invention relates to a method for producing polysilicon.

BACKGROUND ART

As a method for industrially producing polysilicon used as a raw material of a semiconductor or a wafer for photovoltaic power generation, the Siemens process is known. According to the Siemens process, a source gas composed of hydrogen and trichlorosilane is fed into a bell-shaped (bell-jar-shaped) chemical reactor, and a filament for depositing polysilicon thereon, which filament is provided in a standing manner in the chemical reactor, is heated so that polysilicon is deposited on a surface of the filament. Thereafter, the polysilicon is grown to produce a polysilicon rod. A waste gas generated during the above deposition reaction generally contains chlorosilanes (such as unreacted trichlorosilane; tetrachlorosilane generated during the deposition reaction; dichlorosilane generated during the deposition reaction as a by-product; and a silylene polymer), unreacted hydrogen, and hydrogen chloride generated during the deposition reaction. The waste gas is processed in a subsequent step so that the chlorosilanes and the hydrogen chloride are separated from the unreacted hydrogen, and the unreacted hydrogen thus obtained is then reused as a source of hydrogen. From the chlorosilanes, trichlorosilane which is refined is recovered and then reused as a raw material.

A waste gas processing method in the Siemens process includes a step of cooling a hot waste gas, which has been discharged from a chemical reactor, to a temperature at which separation of chlorosilanes is to be carried out. Conventionally, depending on purposes, various conditions have been suggested for such a waste gas cooling method.

For example, Patent Literature 1 discloses a method for producing polycrystalline silicon, in which method a waste gas discharged from a reaction vessel is rapidly cooled in such a manner that it takes not more than 0.1 seconds for a temperature to drop from 800° C. to 500° C. This production method disclosed in the Patent Literature 1 is intended to effectively remove phosphorus from a waste gas discharged from a reaction vessel.

CITATION LIST

Patent Literature

[Patent Literature 1]
International Publication No. WO 2010/090203

SUMMARY OF INVENTION

Technical Problem

For the purpose of facilitating maintenance of a chemical reactor, a blocking valve may be provided to a waste gas pipe connected to the chemical reactor so that the pipe connected to the chemical reactor can be disconnected from the chemical reactor. The inventor of the present invention uniquely found that, in such a case, heat resistance of the blocking valve, with which a hot waste gas comes into contact, and deposition of a silylene polymer in a portion of the pipe which portion is located on a chemical-reactor side of the blocking valve are issues. That is, a location at which the pipe connected to the chemical reactor is disconnected from the chemical reactor is preferably close to the chemical reactor. However, in so doing, thermal degradation of the blocking valve, which thermal degradation is caused by contact with the hot waste gas discharged from the chemical reactor, is problematic. Particularly, the thermal degradation of the blocking valve is promoted by a further increase in temperature of the waste gas in a region in which, in a deposition program, a deposition rate of a silicon rod in the chemical reactor becomes maximum. Moreover, after the pipe is disconnected at a location upstream of the blocking valve, air comes into contact with the portion of the pipe which portion is located on the chemical-reactor side. Therefore, adhesion of a silylene polymer to an interior of the portion of the pipe which portion is located on the chemical-reactor side creates a risk of, for example, ignition.

No conventional technique has made a suggestion about such issues/problems and solutions.

Solution to Problem

In order to solve the foregoing issues/problems, the inventor of the present invention conducted diligent studies, and consequently found that, by providing a cooler of an indirect cooling type to a portion of a waste gas pipe which portion is located between a vicinity of a waste gas outlet of a chemical reactor and a blocking valve, it is possible to prevent a temperature of a waste gas from becoming equal to or higher than a heat-resistant temperature of the blocking valve and possible to suppress adhesion of a silylene polymer to a waste gas pipe. That is, the invention of the present invention encompasses the following method.

[1] A method for producing polysilicon, the method including the steps of: a) producing polysilicon by the Siemens process with use of a chemical reactor, the chemical reactor being connected to a waste gas processing facility via a waste gas pipe, the waste gas pipe including a blocking valve configured to allow the chemical reactor to be connected to the waste gas processing facility in such a manner that the chemical reactor can be disconnected from the waste gas processing facility, the blocking valve being provided in a vicinity of a waste gas outlet of the chemical reactor; and b) cooling a waste gas in a portion of the waste gas pipe, which portion is located between the waste gas outlet of the chemical reactor and the blocking valve, with use of a cooler of an indirect cooling type.

Advantageous Effects of Invention

According to an aspect of the present invention, by providing (i) a blocking valve to a waste gas pipe connected to a chemical reactor and (ii) providing a cooler of an indirect cooling type to a portion of the waste gas pipe which portion is located between the chemical reactor and the blocking valve, it is possible to provide the blocking valve in a vicinity of the chemical reactor while preventing thermal degradation of the blocking valve. Furthermore, it is possible to shorten a portion of the waste gas pipe which portion remains connected to the chemical reactor after the chemical reactor is disconnected from the rest of the waste gas pipe, and possible to facilitate maintenance of the chemical reactor. Moreover, although a portion of the waste gas pipe which portion is located upstream of the blocking valve is exposed to air after such disconnection, cooling a waste gas with use of the cooler of an indirect cooling type prevents the waste gas from being locally excessively cooled. It is therefore possible to effectively prevent adhesion of a silylene polymer to an interior of the cooler and an interior of a portion of the pipe which portion is located downstream of the cooler and is located upstream of the blocking valve. Thus, it is possible to safely disconnect the chemical reactor from a waste gas processing facility.

DESCRIPTION OF EMBODIMENTS

Figure 1:
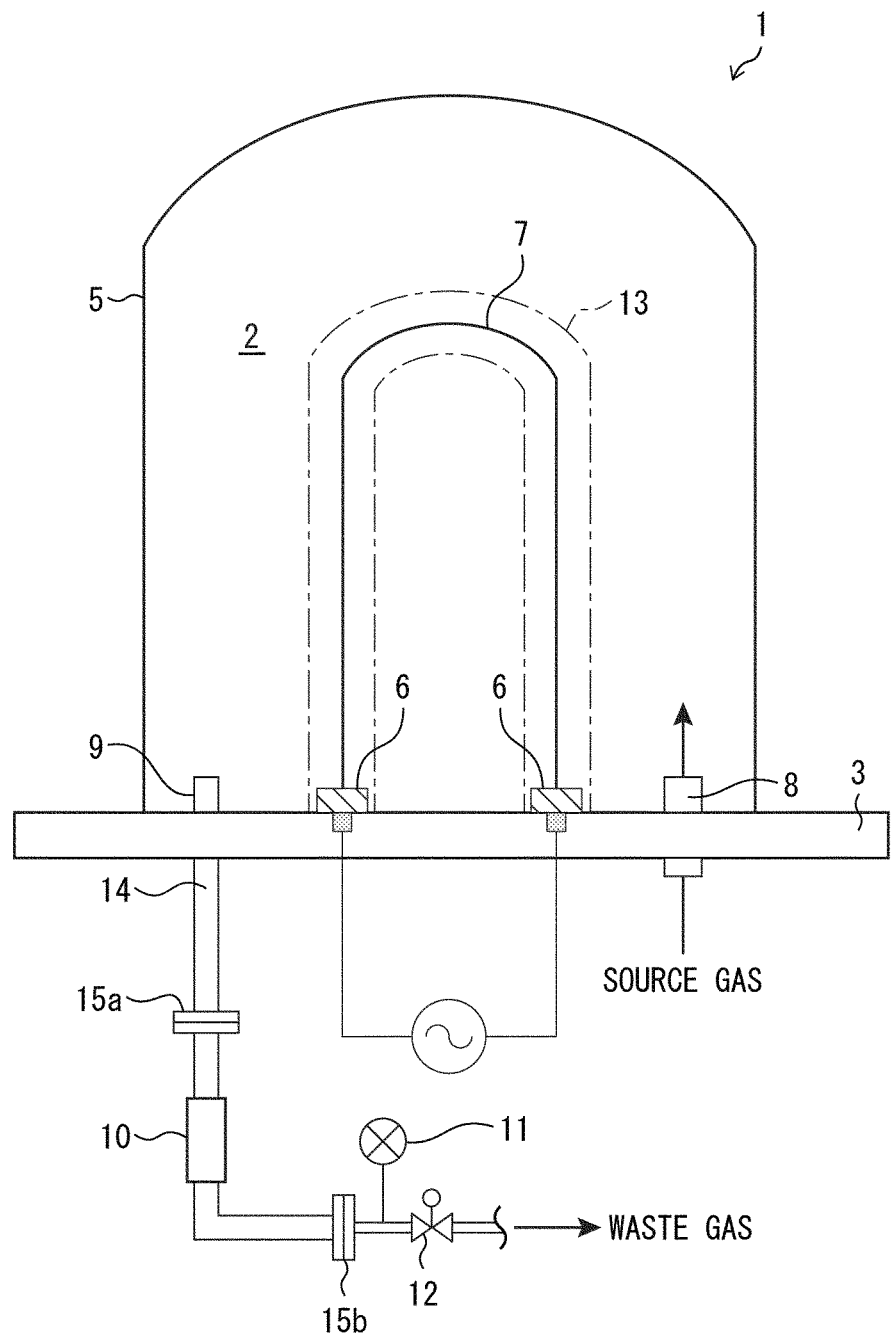
FIG. 1 is a view schematically illustrating a structure of a chemical reactor for producing polysilicon in accordance with an aspect of the present invention.

The following description will discuss an embodiment of the present invention. The present invention is, however, not limited to the embodiment below. Unless otherwise specified herein, a numerical range "A to B" means "not less than A (equal to or more than A) and not more than B (equal to or less than B)".

1. Brief Description of the Present Invention

A waste gas discharged in a polysilicon depositing step is supplied to a waste gas processing facility through a waste gas pipe. In order that a chemical reactor can be disconnected from the waste gas processing facility, a blocking valve can be provided which partitions a waste gas outlet of the chemical reactor and the waste gas processing facility.

The waste gas soon after discharged through the waste gas outlet can be hot. Therefore, in a case where the waste gas at a temperature exceeding a heat-resistant temperature of the blocking valve reaches the blocking valve, the blocking valve may be adversely affected, i.e., deformed or damaged, for example.

The heat-resistant temperature of the blocking valve is, for example, not higher than 500° C. In this case, in order to prevent the temperature of the waste gas from exceeding the heat-resistant temperature of the blocking valve, i.e., 500° C., it is necessary to control a polysilicon deposition reaction by, for example, suppressing an electric current in the polysilicon depositing step. The inventor of the present invention thus considered that controlling the polysilicon deposition reaction could disadvantageously impair efficiency of production of polysilicon. Furthermore, in a case where the blocking valve is provided at a location distant from the waste gas outlet of the chemical reactor, a production facility itself can be large. Moreover, the inventor of the present invention considered that rapid cooling of the waste gas could lead to excessive cooling of the waste gas, deposition of a silylene polymer, which is ignitable, and then adhesion of the silylene polymer to the waste gas pipe, resulting in blockage of the waste gas pipe.

Under the circumstances, the inventor of the present invention developed a method for decreasing a temperature of a waste gas without considerably impairing efficiency of production of polysilicon. The following description will discuss the method.

2. Polysilicon Producing Device

First, a production device used in a method for producing polysilicon in accordance with an embodiment of the present invention will be described.

A device for producing polysilicon in accordance with an embodiment of the present invention is a device including; a chemical reactor in which polysilicon is produced by the Siemens process, the chemical reactor being connected to a waste gas processing facility via a waste gas pipe, the waste gas pipe including a blocking valve configured to allow the chemical reactor to be connected to the waste gas processing facility in such a manner that the chemical reactor can be disconnected from the waste gas processing facility, the blocking valve being provided in a vicinity of a waste gas outlet of the chemical reactor; and a cooler of an indirect cooling type which is provided to a portion of the waste gas pipe which portion is located between the waste gas outlet of the chemical reactor and the blocking valve.

2-1. Chemical Reactor

FIG. 1 is a view schematically illustrating a structure of a chemical reactor for producing polysilicon. A chemical reactor 1 includes a bell jar 5. The bell jar 5 is attached to a bottom plate 3 with use of, for example, a bolt in such a manner that the bell jar 5 can be opened and closed.

In a reaction chamber 2 inside the bell jar 5, a silicon filament 7 is provided in a standing manner via electrodes 6 provided on the bottom plate 3. Each of the electrodes 6 can be made of carbon, SUS, Cu, or the like. Note that FIG. 1 shows merely a single silicon filament 7, but, typically, a plurality of silicon filaments 7 can be provided depending on a volume of the reaction chamber 2. In this case, each of the plurality of silicon filaments 7 is provided in a standing manner in a state of being connected to electrodes 6, and electric power is supplied to each of the plurality of silicon filaments 7.

Since a temperature inside the reaction chamber 2 becomes high, the bell jar 5 is preferably made of a material which has good heat resistance, has a good lightweight property, does not adversely affect a reaction, and can be easily cooled. From this viewpoint, the bell jar 5 is preferably made of stainless steel. An outer surface of the bell jar 5 can be covered with a cooling jacket.

A source gas feeding port 8 is provided to the bottom plate 3. The source gas feeding port 8 is a port through which a source gas is fed into the reaction chamber 2. Further, a waste gas pipe 9 is provided to the bottom plate 3. The waste gas pipe 9 is a pipe through which a waste gas is discharged. A plurality of waste gas pipes 9 can be provided and connected to the chemical reactor 1. In a case where a plurality of waste gas pipes are provided, the plurality of waste gas pipes can be provided together to a header (not illustrated).

The chemical reactor 1 is connected to a waste gas processing facility (not illustrated) via the waste gas pipe 9. To the waste gas pipe 9, a cooler 10, a thermometer 11, and a blocking valve 12 are provided in this order from a waste gas outlet 14 toward the waste gas processing facility.

2-2. Blocking Valve

The blocking valve 12 provided to the waste gas pipe 9 allows the chemical reactor 1 to be connected to the waste gas processing facility in such a manner that the chemical reactor 1 can be disconnected from the waste gas processing facility. The blocking valve 12 is opened while a polysilicon depositing step is being carried out in the chemical reactor 1. In so doing, a waste gas discharged from the chemical reactor 1 is transferred to the waste gas processing facility through the waste gas pipe 9. While a polysilicon deposition reaction is not being carried out, the blocking valve 12 is closed, and supply of the waste gas from the chemical reactor 1 to the waste gas processing facility is blocked. By then disconnecting the chemical reactor 1 from the waste gas processing facility, it is possible to safely carry out an opening operation after the polysilicon deposition reaction ends.

The blocking valve 12 is not limited to any particular one, provided that the blocking valve 12 has a movable mechanism which allows opening and closing of a passage through which a fluid is caused to flow or which is blocked. For example, a publicly known heat-resistant blocking valve, such as a pneumatic heat-resistant blocking valve or a hydraulic heat-resistant blocking valve, can be suitably used.

A material of which the blocking valve is made is not limited to any particular one, provided that the material has heat resistance to some extent. Examples of the material include iron and steel such as cast iron, cast steel, forged steel, and stainless steel. The blocking valve has a heat-resistant temperature of typically not lower than 450° C., preferably not lower than 480° C., more preferably not lower than 490° C. Note, however, that, in a case where the blocking valve is exposed to a temperature exceeding 500° C. for long hours, thermal degradation of the blocking valve is caused. This impairs a blocking performance of the blocking valve.

The blocking valve 12 is provided in a vicinity of the waste gas outlet 14 of the chemical reactor 1. The blocking valve 12 is provided at a location at or within preferably 10 m, more preferably 8 m, of the waste gas outlet 14 of the chemical reactor 1. Note here that a distance from the waste gas outlet 14 of the chemical reactor 1 intends a length of the waste gas pipe from the waste gas outlet 14 to the blocking valve 12. According to the above configuration, it is possible to make an entire polysilicon producing facility smaller in size. Moreover, it is possible to shorten a length of a region of the waste gas pipe to which region a silylene polymer may adhere (that is, a region ranging from the waste gas outlet to the waste gas processing facility).

2-3. Cooler

The cooler 10 is provided between the waste gas outlet 14 of the chemical reactor 1 and the blocking valve 12. Since it is preferable that the blocking valve 12 be provided at a location at or within 10 m of the chemical reactor 1 as has been described, it is also preferable that the cooler 10 be provided at a location at or within 10 m of the chemical reactor 1.

The cooler 10 to be used is preferably a cooler of an indirect cooling type which indirectly cools a waste gas, from the viewpoint of (i) easiness of temperature control and (ii) prevention of excessive cooling of the waste gas. Use of the cooler of an indirect cooling type allows moderate cooling of the waste gas in the waste gas pipe. Therefore, a silylene polymer does not easily adhere to the waste gas pipe.

The cooler of an indirect cooling type is not limited to any particular one, but a shell and tube cooler is preferably used from the viewpoint of easiness of temperature control. According to the above configuration, it is possible to more easily perform temperature control, and possible to moderately cool the waste gas in the waste gas pipe.

As the shell and tube cooler, a publicly known shell and tube cooler can be used. Examples of the shell and tube cooler include floating-tube-sheet coolers, fixed-tube-sheet coolers, floating-head coolers, and U-tube coolers. Note, however, that a U-tube cooler is preferably used from the viewpoint of maintenance. Note also that the thermometer 11 can be provided between the cooler 10 and the blocking valve 12 and in a vicinity of the blocking valve. According to the above configuration, it is possible to check a temperature of the waste gas which has passed through the cooler 10, before the waste gas passes through the blocking valve 12.

3. Method for Producing Polysilicon

A method for producing polysilicon in accordance with an embodiment of the present invention is a method for producing polysilicon, the method including the steps of: a) producing polysilicon by the Siemens process with use of a chemical reactor, the chemical reactor being connected to a waste gas processing facility via a waste gas pipe, the waste gas pipe including a blocking valve configured to allow the chemical reactor to be connected to the waste gas processing facility in such a manner that the chemical reactor can be disconnected from the waste gas processing facility, the blocking valve being provided in a vicinity of a waste gas outlet of the chemical reactor; and b) cooling a waste gas in a portion of the waste gas pipe, which portion is located between the waste gas outlet of the chemical reactor and the blocking valve, with use of a cooler of an indirect cooling type.

According to the above configuration, by providing a cooler, it is possible to provide a blocking valve in a vicinity of a waste gas outlet. This allows an entire facility to be smaller in size. Furthermore, since the cooler is of an indirect cooling type, it is possible to easily perform temperature control, and possible to prevent excessive cooling of a waste gas. It is therefore possible to more efficiently producing polysilicon.

Moreover, it is possible to shorten a length of a region of a waste gas pipe to which region a silylene polymer may adhere, and possible to prevent excessive cooling of the waste gas to a temperature at which a silylene polymer deposits. Thus, it is possible to suppress adhesion of a silylene polymer to the waste gas pipe. Therefore, it is possible to prevent ignition arising from a silylene polymer. Accordingly, it is possible to safely disconnect a chemical reactor from a waste gas processing facility.

The above production method can be carried out by the above-described device for producing polysilicon in accordance with an embodiment of the present invention. Note that description of matters which have been already described in [2. Polysilicon producing device] will be omitted below and the foregoing description will be employed as necessary.

3-1. Polysilicon Depositing Step

The above production method includes a step of producing polysilicon by the Siemens process with use of a chemical reactor. This step will be also referred to as a polysilicon depositing step in this specification. In the polysilicon depositing step, polysilicon is deposited by reacting a chlorosilane compound with hydrogen. In the above production method, the polysilicon depositing step is carried out by the Siemens process.

The polysilicon depositing step in the Siemens process will be schematically described below with reference to FIG. 1. Supply of electric power to a silicon filament 7 is started via electrodes 6 so that the silicon filament 7 is heated to a temperature equal to or higher than a temperature at which polysilicon deposits. The temperature at which polysilicon deposits is not limited to any particular temperature. However, from the viewpoint of rapid deposition of polysilicon on the silicon filament 7, the silicon filament 7 is preferably heated, by supply of electric power to the silicon filament 7, so that the temperature at which polysilicon deposits is kept at a temperature of approximately 1000° C. to 1100° C.

A source gas is fed into a chemical reactor 1 through a source gas feeding port 8. This causes the source gas to be supplied to the silicon filament 7 which is heated by supply of electric power to the silicon filament 7. Examples of the source gas include a mixed gas containing (i) a gas of a silane compound and (ii) hydrogen. By a reaction of the source gas, that is, a reduction reaction of the silane compound, polysilicon 13 is generated.

As the gas of the silane compound, a gas of a silane compound(s), such as monosilane, trichlorosilane, silicon tetrachloride, monochlorosilane, and/or dichlorosilane, is used. Generally, a trichlorosilane gas is suitably used. From the viewpoint of obtainment of highly pure polysilicon, trichlorosilane used in the polysilicon depositing step preferably has a purity of not less than 99.9%.

The hydrogen is used as a reducing gas. An amount of the hydrogen supplied in the polysilicon depositing step is not limited to any particular amount, provided that the amount is in excess of an amount of the silane compound. Note, however, that the hydrogen is supplied in an amount of preferably not less than 3 mol with respect to 1 mol of the silane compound so that polysilicon is efficiently deposited.

In the polysilicon depositing step, most of the hydrogen contained in the source gas can be supplied with a hydrogen gas obtained by recycling a waste gas by refining, and deficiency can be made up for by hydrogen obtained by a publicly known production method. For example, such hydrogen can be produced by electrolysis of water. Specifically, it is possible to electrolyze water by causing an electric current to flow through an aqueous electrolytic solution containing an inorganic acid metal salt and/or a metal hydroxide as an electrolyte(s) (i.e., an aqueous solution which contains an inorganic acid metal salt and/or a metal hydroxide as a solute(s)). In order to remove a metallic impurity from hydrogen obtained through the electrolysis, it is preferable to wash the hydrogen with water and further pass the hydrogen through a mist filter. By washing the hydrogen with water and further passing the hydrogen through a mist filter, it is possible to obtain hydrogen which substantially contains no metallic impurity. Further, the hydrogen preferably contains no gaseous impurities such as oxygen and water vapor. Oxygen and water vapor can be removed by a publicly known method which is used to obtain industrial hydrogen. From the viewpoint of obtainment of highly pure polysilicon, the hydrogen used in the polysilicon depositing step preferably has a purity of not less than 99.99 vol %.

Use of the above-described highly pure trichlorosilane and the above-described highly pure hydrogen makes it possible to obtain highly pure polysilicon having a purity of not less than 11 N.

Note that, by controlling supply of electric power to the chemical reactor in the polysilicon depositing step, it is possible to decrease a temperature of the waste gas. A decrease in the temperature of the waste gas more facilitates temperature control performed by a cooler of an indirect cooling type (later described). It is preferable to control a maximum temperature of the waste gas to be, for example, approximately 550° C. to 700° C., by a method for controlling supply of electric power.

3-2. Cooling Step

The above production method includes a step of cooling the waste gas in a portion of a waste gas pipe 9, which portion is located between a waste gas outlet 14 of the chemical reactor 1 and a blocking valve 12, with use of a cooler 10 of an indirect cooling type. The waste gas generated as a by-product by a reaction between the silane compound and the hydrogen is discharged outside the chemical reactor 1 through the waste gas pipe 9. The waste gas is cooled by the cooler 10.

In such a cooling step, the waste gas is cooled by the cooler 10 while the waste gas is passing through the portion of the waste gas pipe 9 which portion is located between the waste gas outlet 14 and the blocking valve 12. The waste gas then passes through the blocking valve 12 in a state where the waste gas is cooled, and is transferred to a waste gas processing facility.

A rate at which the temperature of the waste gas is decreased by cooling only needs to be such a rate that a silylene polymer does not deposit. Specifically, time for which the waste gas resides in the cooler (hereinafter referred to as residence time) is preferably approximately not less than 0.1 seconds, more preferably more than 0.1 seconds. It is found from this fact that, unlike the conventional technique disclosed in Patent Literature 1, the waste gas is moderately cooled in the above production method.

Furthermore, while the waste gas is being cooled in the cooling step, a minimum temperature of a wall surface of the cooler 10, with which wall surface the waste gas comes into contact, is preferably set to a temperature of higher than 180° C. A silylene polymer can deposit at a temperature of not higher than 180° C. Therefore, by setting the minimum temperature of the wall surface, with which the waste gas comes into contact, to a temperature exceeding a temperature at which a silylene polymer deposits, it is possible to prevent deposition of a silylene polymer and adhesion of the silylene polymer to the pipe.

Moreover, in the cooling step, the temperature of the waste gas passing through the blocking valve 12 is adjusted to preferably not lower than 200° C. and not higher than 500° C., more preferably not lower than 300° C. and not higher than 500° C. According to the above configuration, it is possible to efficiently produce polysilicon, by adjusting the temperature of the waste gas passing through the blocking valve to a temperature at which a silylene polymer does not deposits and which falls within a range in which the blocking valve can exhibit heat resistance. Furthermore, it is possible to provide the blocking valve 12 in a vicinity of the waste gas outlet 14 of the chemical reactor as has been described.

3-3. Disconnection of Waste Gas Pipe

According to an embodiment of the present invention, after the reaction ends, the chemical reactor is disconnected, on a chemical-reactor side of the blocking valve, from a portion of the waste gas pipe which portion includes the blocking valve and a subsequent downstream region.

Generally, a flange part is provided as illustrated in FIG. 1, and a chemical reactor is disconnected from a waste gas pipe at the flange part. Note that the flange part can be provided as a structure of a cooler. FIG. 1 illustrates a mode in which two pairs of flanges are provided so as to sandwich the cooler therebetween, and, after the chemical reactor is disconnected at a flange part 15b which is one of the two pairs and is closer to the blocking valve 12, the cooler is further detached, as necessary, by disconnecting a flange part 15*a* which is the other of the two pairs and is located on the chemical-reactor side.

After the chemical reactor is thus disconnected from the portion of the waste gas pipe which portion includes the blocking valve and the subsequent downstream region, there is little adhesion of a substance, such as a silylene polymer, to a portion of the waste gas pipe which portion is located between the blocking valve and the chemical reactor. Therefore, it is possible to open the waste gas pipe as it is. However, in case a silylene polymer is present in a tiny amount, it is preferable to wash (i) an interior of the portion of the waste gas pipe which portion is located between the blocking valve and the chemical reactor and (ii) an interior of the cooler, with a liquid of a chlorosilane such as tetrachlorosilane after the chemical reactor is disconnected.

Moreover, after such disconnection, a silylene polymer adheres, in a large amount, to an interior of the portion of the waste gas pipe which portion includes the blocking valve and the subsequent downstream region. It is therefore preferable to remove the silylene polymer by causing the chlorosilane to flow from a blocking-valve side.

3-4. Other Steps

The above production method can include, for example, a separating step, a hydrogen chloride removing step, and/or a hydrogen refining step, as a step(s) carried out after the waste gas is transferred to the waste gas processing facility.

The separating step is a step of separating the waste gas into a chlorosilane condensate and a gas component. The chlorosilane condensate can be supplied to a step such as the hydrogen chloride removing step (later described). The gas component obtained in the separating step contains a hydrogen gas and hydrogen chloride as main components.

The hydrogen chloride removing step is a step of removing hydrogen chloride by bringing the gas component, obtained in the separating step, into contact with a chlorosilane solution. In the hydrogen chloride removing step, hydrogen chloride which is contained in the gas component obtained in the separating step is removed by bringing the chlorosilane solution into contact with the gas component to absorb the hydrogen chloride. A gas component obtained in the hydrogen chloride removing step contains a hydrogen gas as a main component.

The chlorosilane solution used in the hydrogen chloride removing step is a liquid which contains a chlorosilane compound. Examples of the chlorosilane compound include, but not particularly limited to, trichlorosilane, dichlorosilane, and tetrachlorosilane. The chlorosilane solution used in the hydrogen chloride removing step can contain part of the chlorosilane condensate obtained in the separating step.

Examples of a method for bringing the chlorosilane solution into contact with the gas component in the hydrogen chloride removing step include, but not particularly limited to, publicly known methods such as a bubbling method, a packed tower method, and a shower method. The hydrogen chloride removing step can be carried out in publicly known equipment such as a gas-liquid contact column.

The hydrogen refining step is a step of removing the chlorosilane compound by bringing the gas component, obtained in the hydrogen chloride removing step, into contact with activated carbon and thereby obtaining a hydrogen gas. The hydrogen refining step can be carried out by, for example, supplying the gas component, obtained in the hydrogen chloride removing step, to an adsorption tower which is filled with an activated carbon layer or activated carbon. By bringing the gas component, obtained in the hydrogen chloride removing step, into contact with activated carbon in the adsorption tower, the chlorosilane compound is adsorbed and removed by the activated carbon. It is thus possible to obtain a hydrogen gas.

The hydrogen gas obtained in the hydrogen refining step is a highly pure hydrogen gas. It is therefore possible to reuse the hydrogen gas as the source gas used in the polysilicon depositing step. Furthermore, the hydrogen gas can be used as hydrogen which is used in a reaction of reduction from tetrachlorosilane to trichlorosilane, or can be used as a source of hydrogen in production of silica which is made from tetrachlorosilane.

Recap

[1] A method for producing polysilicon in accordance with an embodiment of the present invention is a method for producing polysilicon, the method including the steps of: a) producing polysilicon by the Siemens process with use of a chemical reactor, the chemical reactor being connected to a waste gas processing facility via a waste gas pipe, the waste gas pipe including a blocking valve configured to allow the chemical reactor to be connected to the waste gas processing facility in such a manner that the chemical reactor can be disconnected from the waste gas processing facility, the blocking valve being provided in a vicinity of a waste gas outlet of the chemical reactor; and b) cooling a waste gas in a portion of the waste gas pipe, which portion is located between the waste gas outlet of the chemical reactor and the blocking valve, with use of a cooler of an indirect cooling type.

[2] The method as described in [1], wherein the blocking valve is provided at a location at or within 10 m of the waste gas outlet of the chemical reactor.

[3] The method as described in [1] or [2], wherein, in the step b), a minimum temperature of a wall surface of the cooler, with which wall surface the waste gas comes into contact, is set to a temperature of higher than 180° C.

[4] The method as described in any one of [1] through [3], wherein the cooler is a shell and tube cooler.

[5] The method as described in any one of [1] through [4], wherein, in the step b), a temperature of the waste gas passing through the blocking valve is adjusted to not lower than 200° C. and not higher than 500° C.

EXAMPLE

The present invention will be described below in more detail on the basis of an Example. Note, however, that the present invention is not limited to such an Example.

A bell-jar-shaped chemical reactor having a structure illustrated in FIG. 1 was used. After trichlorosilane and hydrogen were fed into the chemical reactor, electric power was supplied to a silicon filament with an electric current of not more than 2000 A so that a silicon deposition reaction was carried out.

As a cooler, a U-tube cooler (shell and tube cooler) was used. As a blocking valve, a gate valve made of stainless steel (having a heat-resistant temperature of 500° C.) was used.

With use of the above device, the silicon filament was heated to approximately 800° C. by supply of electric power to the silicon filament, while a trichlorosilane gas and a hydrogen gas were being fed into the chemical reactor. Polysilicon was thus deposited until the polysilicon had a diameter of 120 mm. In so doing, a temperature and residence time, in each section illustrated in FIG. 2, of a waste gas discharged from the chemical reactor were measured.

Figure 2:
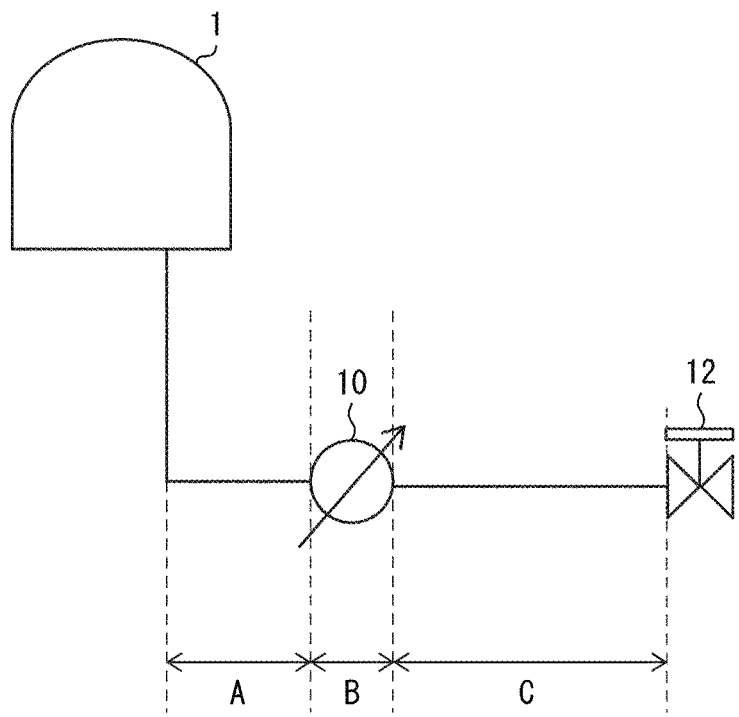
FIG. 2 is a drawing illustrating a waste gas pipe in accordance with an aspect of the present invention, which waste gas pipe is connected from the chemical reactor for producing polysilicon to a blocking valve.

Here, a location at which a cooler 10 was provided will be described with reference to FIG. 2. FIG. 2 is a drawing illustrating a waste gas pipe which is connected from a chemical reactor 1 to a blocking valve 12, and illustrates the location of the cooler 10. A section A illustrated in FIG. 2 indicates a distance from the chemical reactor 1 to a waste gas inlet of the cooler 10. A section B indicates a distance corresponding to an entire length of the cooler 10. A section C indicates a distance from a waste gas outlet of the cooler 10 to the blocking valve 12. Note that Table 1 shows the distances of these sections (see FIG. 2) in this Example.

TABLE 1

| Section | Distance (mm) |
|---|---|
| A | 1,000 |
| B | 2,100 |
| C | 5,000 |

Note also that Table 2 shows (i) conditions of the waste gas flowing through the pipe and (ii) temperatures of the waste gas which were measured before (section A) and after (section C) the waste gas was cooled with use of the cooler.

TABLE 2

| Case | Deposition time (h) | Gas volume (Nm³/h) | Pressure (kPa) | Temperature in section A (° C.) | Temperature in section C (° C.) |
|---|---|---|---|---|---|
| Maximum gas volume | 50 | 4,500 | 130 | 500 | 470 |
| Maximum Temperature at outlet | 70 | 4,200 | 130 | 526 | 496 |

Note also that Table 3 shows the residence time calculated in each section illustrated in FIG. 2.

TABLE 3

| | | Residence time (second) | |
|---|---|---|---|
| Section | Distance (m) | Maximum gas volume | Maximum temperature at outlet |
| A | 1.00 | 0.39 | 0.42 |
| B | 2.10 | 0.11 | 0.11 |
| C | 5.00 | 0.08 | 0.08 |
| Total | 8.10 | 0.58 | 0.62 |

As is clear from Table 2, the temperature of the waste gas which had been cooled was lower by 30° C. than that of the waste gas which had not been cooled yet with use of the cooler. Furthermore, as is clear from Table 3, the residence time of the waste gas in the section B, in which the waste gas was cooled, was 0.11 seconds.

As a result of examining an amount of a silylene polymer present in the heat exchanger and in the pipe after the end of production batch of the polysilicon, no silylene polymer was present in the heat exchanger and the pipe. Thus, it was possible to safely disconnect the chemical reactor from the waste gas pipe. Moreover, no damage was found on the blocking valve.

INDUSTRIAL APPLICABILITY

The present invention can be suitably used for a method for producing polysilicon.

REFERENCE SIGNS LIST

1 Chemical reactor
10 Cooler
11 Thermometer
12 Blocking valve
14 Waste gas outlet

The invention claimed is:

1. A method for producing polysilicon, the method comprising the steps of:
    a) producing polysilicon by the Siemens process with use of a chemical reactor,
    the chemical reactor being connected to a waste gas processing facility via a waste gas pipe,
    the waste gas pipe including a blocking valve configured to allow the chemical reactor to be connected to the waste gas processing facility in such a manner that the chemical reactor can be disconnected from the waste gas processing facility,
    the blocking valve being provided in a vicinity of a waste gas outlet of the chemical reactor,
    wherein a length of the waste gas pipe from the waste gas outlet to the blocking valve is not more than 10 m,
    controlling a temperature of the waste gas leaving the chemical reactor to be not lower than 500° C. and not higher than 700° C.; the controlling the temperature of the waste gas including controlling the supply of electric power to the chemical reactor; and
    b) cooling a waste gas in a portion of the waste gas pipe, which portion is located between the waste gas outlet of the chemical reactor and the blocking valve, with use of a shell and tube cooler,
    in the step b), a temperature of the waste gas passing through the blocking valve being adjusted to not lower than 200° C. and not higher than 500° C.

2. The method as set forth in claim 1, wherein, in the step b), a minimum temperature of a wall surface of the cooler, with which wall surface the waste gas comes into contact, is set to a temperature of higher than 180° C.

3. The method as set forth in claim 1, wherein, in the step b), time for which the waste gas resides in the cooler is more than 0.1 seconds.

* * * * *